(12) United States Patent
Rana et al.

(10) Patent No.: US 6,781,992 B1
(45) Date of Patent: Aug. 24, 2004

(54) QUEUE ENGINE FOR REASSEMBLING AND REORDERING DATA PACKETS IN A NETWORK

(75) Inventors: Aswinkumar Vishanji Rana, Plano, TX (US); Corey Alan Garrow, Plano, TX (US)

(73) Assignee: Netrake Corporation, Plano, TX (US)

( * ) Notice: Subject to any disclaimer, the term of this patent is extended or adjusted under 35 U.S.C. 154(b) by 798 days.

(21) Appl. No.: 09/792,209

(22) Filed: Feb. 23, 2001

Related U.S. Application Data (60) Provisional application No. 60/250,220, filed on Nov. 30, 2000.

(51) Int. Cl.[7] .............................................. H04L 12/56
(52) U.S. Cl. ........................ 370/394; 370/412; 370/474
(58) Field of Search ................................. 370/394, 413, 370/474, 412

(56) References Cited

U.S. PATENT DOCUMENTS

| | | | |
|---|---|---|---|
| 5,619,497 A | | 4/1997 | Gallagher et al. |
| 5,629,927 A | | 5/1997 | Waclawsky et al. |
| 5,926,475 A | * | 7/1999 | Saldinger et al. ........... 370/394 |
| 6,246,684 B1 | * | 6/2001 | Chapman et al. ........... 370/394 |
| 6,665,794 B2 | * | 12/2003 | Koker et al. ................. 712/300 |

* cited by examiner

*Primary Examiner*—Kenneth Vanderpuye
(74) *Attorney, Agent, or Firm*—Craig J. Cox (57) ABSTRACT

A queue engine is described that is operable to reorder and reassemble data packets from network traffic into unfragmented and in order traffic flows for applications such as deep packet classification and quality of service determination. The queue engine stores incoming data packets in a packet memory that is controlled by a link list controller. A packet assembler extracts information from each data packet, particularly fields from the header information, and uses that information among other things, to determine if the data packet is fragmented or out of order, and to associate the data packet with a session id. If the packet is determined to be out of order, the queue engine includes a reordering unit which is able to modify links with the link list controller to reorder data packets. A fragment reassembly unit is also included which is capable of taking fragments and reassembling them into complete unfragmented data packets. The reordered and reassembled data packets are then sent to an output where further operations such as deep packet classification can take place.

12 Claims, 6 Drawing Sheets

FIG. 3B
BLOCK LINKED LIST (BLL) WITH SDRAM MEMORY ARRAY:

FIG. 3C
PACKET LIST DATA STRUCTURE:

FIG. 3D
FRAGMENT RAM:

FIG. 3E
FRAGMENT WINDOW:

FIG. 3F
SESSION RAM:

FIG. 3G
SESSION WINDOW:

QUEUE ENGINE FOR REASSEMBLING AND REORDERING DATA PACKETS IN A NETWORK

CROSS-REFERENCE TO RELATED APPLICATION

This application claims priority of Provisional Application Serial No. 60/250,220 which was filed Nov. 30, 2000.

TECHNICAL FIELD OF THE INVENTION

The present invention relates to data networking equipment and network processors. Specifically, the present invention relates to a network engine that reorders and reassembles data packets and fragments in a network data stream at wire speeds.

BACKGROUND OF THE INVENTION

The character and requirements of networks and networking hardware are changing dramatically as the demands on networks change. Not only is there an ever-increasing demand for more bandwidth, the nature of the traffic flowing on the networks is changing. With the demand for video and voice over the network in addition to data, end users and network providers alike are demanding that the network provide services such as quality-of-service (QoS), traffic metering, and enhanced security. However, the existing Internet Protocol (IP) networks were not designed to provide such services because of the limited information they contain about the nature of the data passing over them.

Existing network equipment that makes up the infrastructure was designed only to forward data through the network's maze of switches and routers without any regard for the nature of the traffic. The equipment used in existing networks, such as routers, switches, and remote access servers (RAS), are not able to process any information in the network data stream beyond the packet headers and usually only the headers associated with a particular layer of the network or with a set of particular protocols. Inferences can be made about the type of traffic by the particular protocol, or by other information in the packet header such as address or port numbers, but high-level information about the nature of the traffic and the content of the traffic is impossible to discern at wire speeds.

The ability to look beyond the header information while still in the fast-path and into the packet contents would allow a network device to identify the nature of the information carried in the packet, thereby allowing much more detailed packet classification. Knowledge of the content would also allow specific contents to be identified and scanned to provide security such as virus detection, denial of service (DoS) prevention, etc. Further, looking deeper into the data packets and being able to maintain an awareness of content over an entire traffic flow would allow for validation of network traffic flows, and verification of network protocols to aid in the processing of packets down stream.

One major problem with looking into the contents of data packets at wire speeds is the fact that data packets often end up on the network out of sequence and fragmented. Data packets can end up out of sequence in many ways. For example, one or more later data packets in a sequence may be routed through a different, faster path than earlier data packets causing the sequence to be out of order. Or, a data packet or packets may be held at a device on the network for additional processing or may get stuck in a slower queue in a network device causing later sequenced data packets to be sent ahead of earlier packets.

Similarly, data packets can also become fragmented. Fragmentation can occur when a data packet is transmitted through a device such as a router or switch, which has a maximum limit on the size of packets it processes. If the data packet is greater than this maximum, the packet is broken into two or more fragmented packets to be transmitted. Similarly, data packets that are sent across some ATM networks can end up fragmented, due in part to ATM's maximum cell size of 53 bytes.

Out of sequence packets and fragmented packets make it difficult to scan past header information into the payload contents of packets, and make it impossible to maintain any kind of intelligence or state between data packets since such intelligence or state would require scanning the contents of the packets in order. In order to scan the entire contents of data packets including the payloads, it is necessary to reassemble fragmented packets and reorder out of sequence packets.

Accordingly, what is needed is a queue engine that is able to reorder and reassemble data packets at wire speeds beyond 1 gigabit per second, thereby allowing the scanning of the entire contents of data packets including header and payload information so that state information or awareness can be maintained throughout an entire data traffic flow.

SUMMARY OF THE INVENTION

The present invention provides for a network engine that is operable to reorder and reassembly IP data packets in a network, such a network engine is hereinafter referred to as a queue engine for its ability to place packets into a datastream for applications such as deep packet classification. The queue engine includes an input interface that accepts the data packets into the queue engine where they are stored into a packet memory. A link list control unit and link list memory keep track of the locations of each data packet in memory. The data packets can be broken into smaller blocks for ease of storage and efficient memory consumption, in which case the link list controller keeps track of the location of each block and its relationship to the whole.

A packet assembler extracts information from the data packets, usually from the headers of the data packets and determines whether the data packet is a fragment or is out of sequence. The packet assembler uses unique fields in the data packet to access a session ID, which is used to associate the data packet with a particular traffic flow over the network. The session ID allows each data packet to be assigned to a traffic flow so sequence numbers can be used to anticipate the next data packet and out of order packets can be identified. Out of order packets are sent to a reordering unit, which reorders the data packets by modifying links to the packet memory.

The queue engine can further include a fragment reassembly unit, which is operable to take fragmented packets identified by the packet assembler and reassemble the fragments into complete data packets. Much like the reordering unit, the fragment reassembly unit collects the fragments and then places them into the proper order and modifies the links to the packet memory to reflect the complete data packet.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
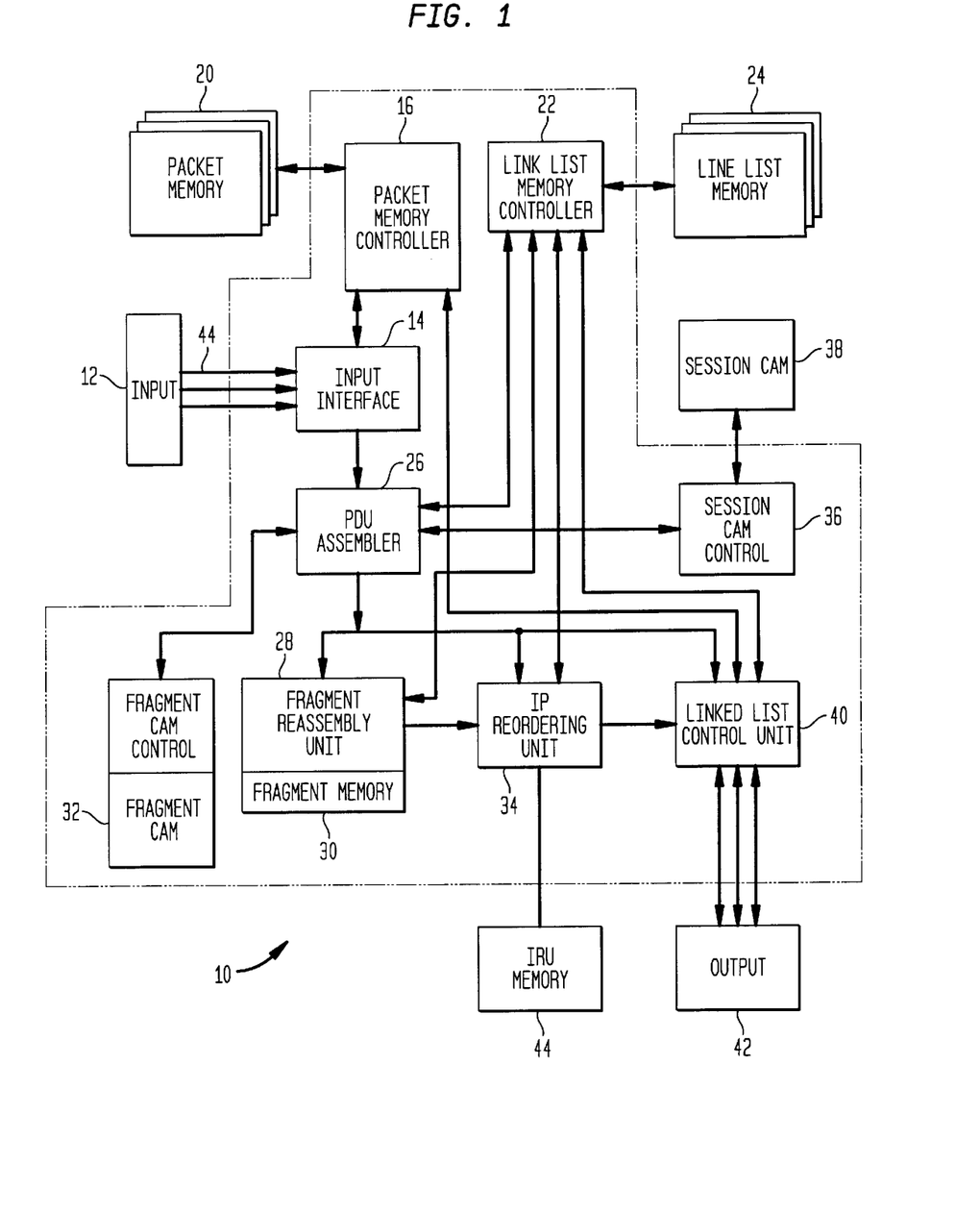
FIG. 1 is a block diagram of the preferred embodiment of the queue engine of the present invention.

Referring now to FIG. 1, the preferred embodiment of the queue engine of the present invention is shown. Queue engine 10 takes network traffic in the form of data packets; also referred to as datagrams, or PDUs when unfragmented, from input 12 on a POS-PHY level 3 or equivalent data bus 44 and acts to buffer, reorder, and reassemble the datagrams, which are then sent to output 42 for further processing. Input interface 14 of queue engine 10 reads data from data bus 44 and stores it in a cache of 64 data buffers, from where it will be written into packet memory 20 using packet memory controller 16. Input interface 14 is also operable to reformat data packets by moving certain information from the end of a packet to the beginning so that the information is more readily accessible by downstream equipment and input interface 14 can provide pointers or offsets to information in the header of the packet such as the beginning of the IP header or the location of the sequence number. Finally, input interface 14 sends some or all of each datagram to PDU assembler 26.

PDU assembler, or packet assembler, 26 is at the core of queue engine 10 and performs several functions. After PDU assembler 26 receives the data packets from input interface it allocates blocks in link list memory 24 using link list memory controller 22. The link lists in link list memory 24 are used by queue engine 10 to track pointers associated with data packets stored in packet memory 20. PDU assembler 26 also deallocates blocks for error conditions including out of memory cases.

PDU assembler 26 is further operable to extract information from the header of the data packet, which is used by queue engine 10 or passed to downstream equipment. The data structure of the extracted fields will be discussed in more detail with reference to FIG. 3a. Once the pertinent fields are extracted, PDU assembler 26 then checks to see if the data packet is associated with a known session, or if the data packet is the first data packet received in a new session. A session, or traffic flow, is comprised of all the data packets that form a unique session across the network, for example, a session could be composed of a TCP/IP session for email or web browsing, a UDP session for streaming video, or any other complete traffic flow across the network. The queue engine assigns a session id to the first data packet received for a new session, and each subsequent packet in the session is associated with that session id.

If the data packet is the first in a session, PDU assembler either requests the assignment of a session id from a source external to queue engine 10, or assigns a session id itself. The session id is a location in session CAM 38 which is associated with the unique signature used to identify each session. The unique signature is comprised of various fields extracted from the header by PDU assembler 26. For example, a session could be identified and assigned a session id based upon the source address, destination address, source port, destination port, protocol fields, and any other field or combination of fields from the header of the data packet which form a unique identifier based on the properties of the session.

In addition to associating a session id with the data packet, PDU assembler 26 also extracts fragment information from the header of the data packet and determines whether the data packet is a fragment. If the data packet is a fragment, PDU assembler 26 interrogates fragment CAM 32 in the same manner as described above with respect to session CAM 36. If the data packet is a fragment from a known session, a fragment id is associated with the data packet, or if the data packet is a new fragment, a fragment id is assigned to the data packet. Fragments are then sent to the fragment reassembly unit 28, which acts to reassemble fragments into complete data packets using data structures and link lists stored in fragment memory 30. The functions of fragment reassembly unit 28 will be discussed in greater detail with reference to FIG. 4.

The final stage of PDU assembler 26 is responsible for queuing completed data packet according to wire order. Once PDU assembler 26 determines that a data packet from a particular session has been completely received according to wire order, PDU assembler 26 sends the completed data packet to either fragment reassembly unit 28, IP reordering unit 34 or link list control unit 40 which controls the output of data packets to output 42. The decision to send data packets to fragment reassembly unit 28, IP reordering unit 34 or link list control unit 40 is determined by the contents of the various fields extracted by PDU assembler 26.

If the data packet received is determined to be a fragment by PDU assembler 26, the data packet is sent to fragment reassembly unit 28. Fragment reassembly unit 28 includes fragment memory 30, which is maintained by fragment reassembly unit 28 and contains numerous fragment windows that are used in the reassembly algorithm. If the fragment ID number retrieved from fragment CAM 32 by PDU assembler 26 is a new fragment ID, fragment memory 30 is updated accordingly. Again, the fragment reassembly process and algorithm will be discussed in greater detail with reference to FIG. 4.

Once fragment reassembly unit 28 has reassembled a complete PDU from all the required datagram fragments using fragment memory 30 and the windows in fragment reassembly unit 28, fragment reassembly unit 28 modifies the links in link list memory 24 using link list memory controller 22 to reflect the reassembled PDU. The reassembled PDU is then sent to either IP reordering unit 34 if the reassembled PDU also requires reordering, or to link list control unit 40 if it is ready to be sent to output 42.

Fragment reassembly unit 28 must also check for time out conditions for each of the fragments being reassembled. As stated, all of the datagram fragments associated with a particular PDU must be received in order to reassemble the entire PDU. If one or more of the datagram fragments is not received, the full PDU cannot be reassembled and both the resources of fragment memory 30 and link list memory 24 would be eventually fill with these unresolved fragments and be rendered useless. To prevent this, a time stamp is associated with each fragment. A timeout condition is generated after a fragment or fragments have been in the fragment reassembly unit for more than a programmable, predetermined amount of time. Once the timeout condition has occurred, all of the fragments for that PDU are discarded and the links in link list memory 24 are deallocated.

In addition to reassembling fragments, queue engine 10 reorders out of sequence PDUs so that every session, or traffic flow that passes through queue engine 10 is sent to the output in order. Unfragmented and in-order PDUs are important for performing deep packet classification where the entire contents of every data packet are scanned. Packets using sequence numbers, such as TCP sessions, are forwarded by PDU assembler 26 to IP reordering unit 34 where the sequence numbers within the header of each PDU are extracted, tracked, and used to determine whether the PDU in question is the next expected packet for the session, or traffic flow. If the PDU is not the next expected packet, it is processed as an out of order packet by IP reordering unit 34. IP reordering unit 34 uses IRU memory 44 to keep track of windows which reflect PDUs belonging to a particular traffic flow and where each PDU belongs in sequence. As with fragment reassembly unit 28, IP reordering unit 34 is able to modify the link lists in link list memory 24 using link list memory controller 22 in order to place PDUs in the correct order. Once the next expected PDU is received and placed into the proper place in sequence it is sent to link list control unit 40 for forwarding to output 42.

As with fragment reassembly unit 28, out of order PDUs need to be associated with a time stamp and checked for timeout conditions so that the operation of queue engine 10 is not affected by PDUs missing from traffic flows. If a timeout condition is detected link list memory controller 22 is used by IP reordering unit 34 to deallocate the memory locations associated with PDUs from the traffic flow with the timeout condition.

As described, link list control unit 40 accepts complete, in order PDU from PDU assembler 26, fragment reassembly unit 28 or IP reordering unit 34 into a queue for transmission to output 42. Link list control unit 40 is also responsible for maintaining free lists for both link list memory 24 and packet memory 20, and is responsible for allocating and deallocating blocks as packets pass through queue engine 10 or are subject to a timeout condition.

Figure 2:
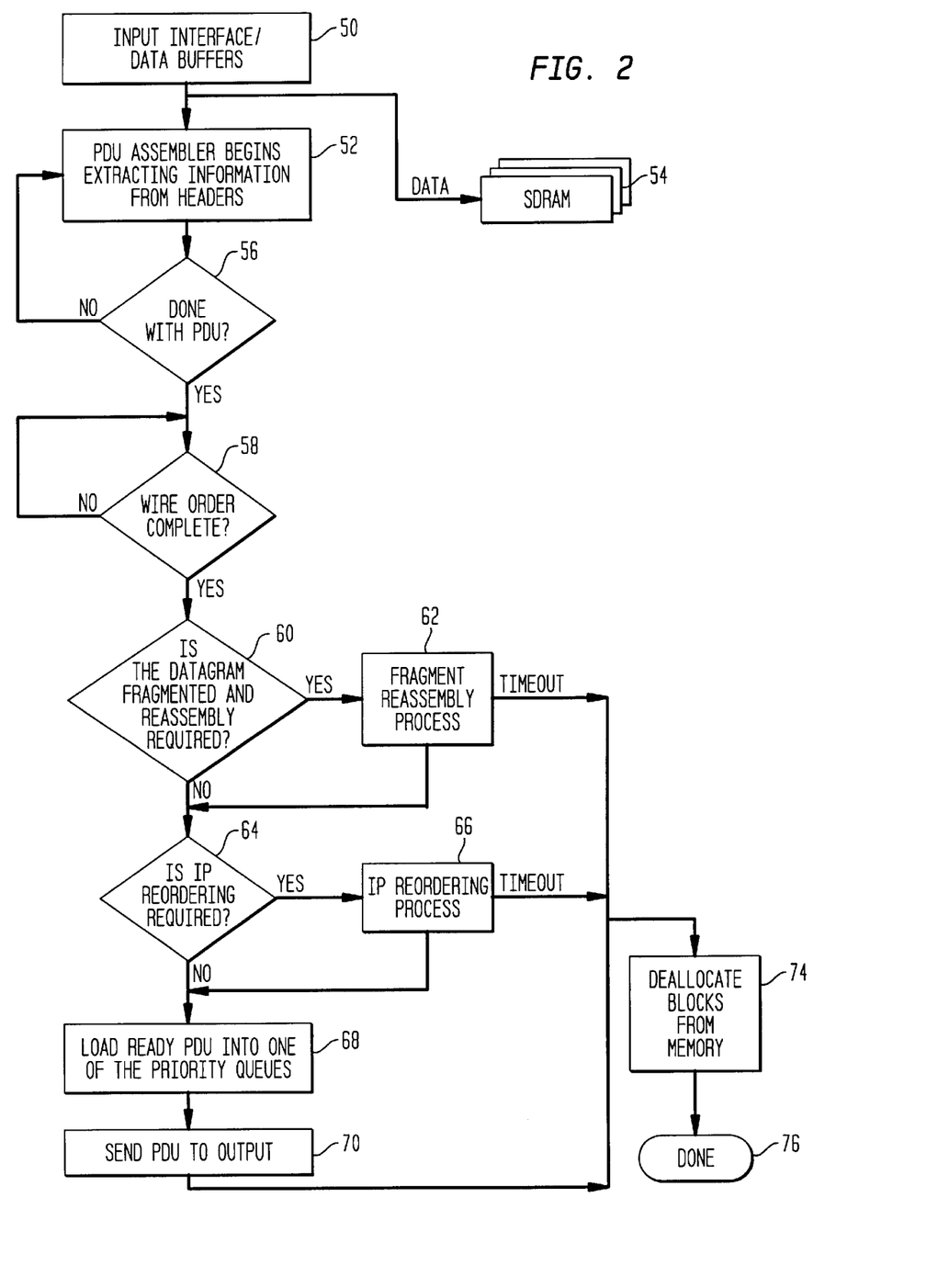
FIG. 2 is a data flow diagram for the queue engine of the present invention.

Referring now to FIG. 2, a flow diagram showing the operation flow of queue engine 10 from FIG. 1 is described, and various references will be made to elements described with reference to FIG. 1. The process begins at block 50 where the data is received and buffered at input interface 14. The process then proceeds to blocks 52 and 54 where PDU assembler 26 extracts the required information from the various PDU headers, and the PDU is written into packet memory 24, respectively. As described above, PDU assembler 26 can use the extracted header information for a variety of purposes, including but not limited to determining a unique identifier for the session with which the PDU is associated, determining whether the PDU is out of order, and determining whether the PDU is a fragment. After PDU assembler 26 extracts the required fields from the headers of the PDU, block 56 determines whether PDU assembler 26 has received the entire PDU. If the entire PDU has not been received then the process returns to block 52.

Block 58 checks to ensure that all preceding, in terms of wire order, PDUs have been completely received. For example, the PDU in question may be a small PDU of a few hundred bytes and has been completely received by the queue engine. However, the preceding PDU may be very large (thousands of bytes) and may have begun to be initially received before the PDU in question, but may not have been completely received. In such a case, the PDU in question must be held until the preceding PDU has been completely received. If block 58 determines that the wire order is not complete, the process returns to block 58, or the process passes to block 60 if wire order is determined to be complete.

In block 60 the header information extracted by PDU assembler 26 is examined to determine if the PDU is fragmented and requires reassembly. If the PDU is fragmented the process passes to block 62. Block 62 represents the reassembly process described with respect to FIGS. 1 and 4. As described the reassembly process includes a timeout mechanism, which if triggered passes the process to block 74 which deallocates the blocks from link list memory 24 and packet memory 20. After the reassembly process is complete, or if the PDU is determined not to be a fragment by block 60, the process passes to block 64, which determines whether the packet is out of order and reordering is required. If reordering is required, the process passes to block 66 which reorders the PDU as described. Again, a timeout mechanism exists that passes the process to block 74 when triggered.

Once reordering is complete, or if block 64 determines that reordering is not required, the process passes to block 68 which sends the PDU to link list control unit 40 where it is placed into an output queue and then transmitted to the output as represented by block 70. Once the PDU has been transmitted to the output, the process passes to block 74 which deallocates the links in link list memory 24 and packet memory 20 as described. Finally, the process passes to DONE block 76.

Figure 3A:
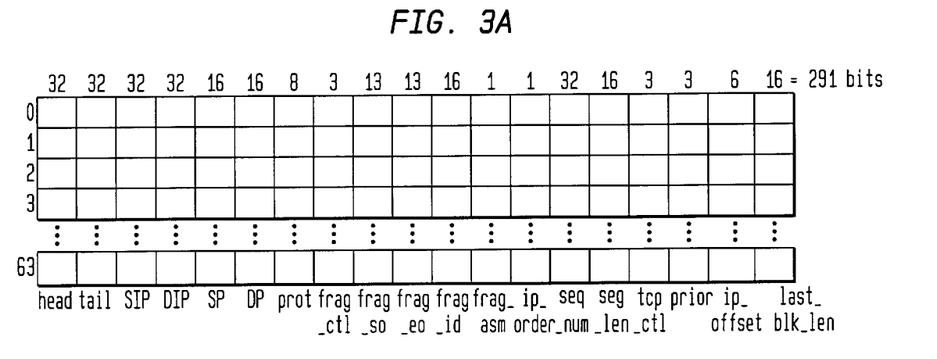
FIGS. 3a–g are diagrams of the data structures used in the queue engine of the present invention.

Referring now to FIGS. 3*a*–3*g*, the data structures used within the elements and associated memory of the queue engine are shown. While FIGS. 3*a* through 3*g* show the preferred embodiment of each data structure, one skilled in the art would easily understand that different data structures could be used without departing from the scope of the present invention. FIG. 3*a* shows an example of the fields that may be extracted from the headers of each PDU by PDU assembler 26 from FIG. 1. FIG. 3*a* shows such fields as source address (SIP) and port (SP), destination address (DIP) and port (DP) and protocol (prot) extracted as examples of fields that can be used to assign a unique identifier to the associated data stream. Additionally, fragment and sequence fields such as frag_ctl, frag_so, etc. and seq_num, seg_len to illustrate the fields that can be used to determine fragmented and out of order PDUs and to provide inputs to fragment reassembly unit 28 and IP reordering unit 34 from FIG. 1.

Figure 3B:
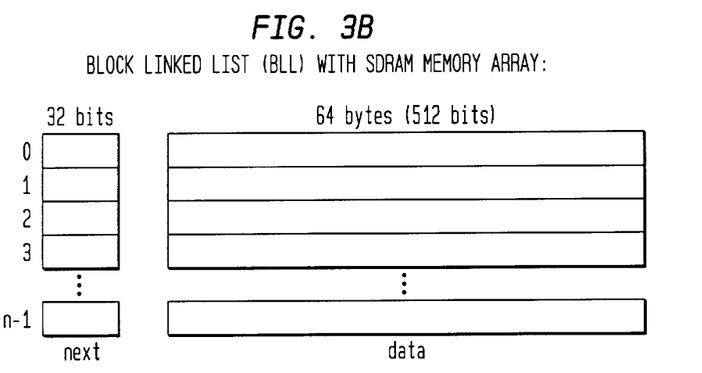

FIG. 3*b* shows the preferred data structure used in packet memory 20 from FIG. 1. Packet memory 20 stores each PDU that is processed by the queue engine in 64 byte blocks as shown by the data portion of the structure. Additionally, since most PDUs are larger than 64 bytes, packet memory 20 stores a pointer in the next field which is the address of the next 64 byte block of memory containing data from the PDU. Keeping the pointer prevents the queue engine from having to manage packet memory into contiguous blocks the size of each PDU, which would necessarily result in inefficient use of packet memory 20.

Figure 3C:
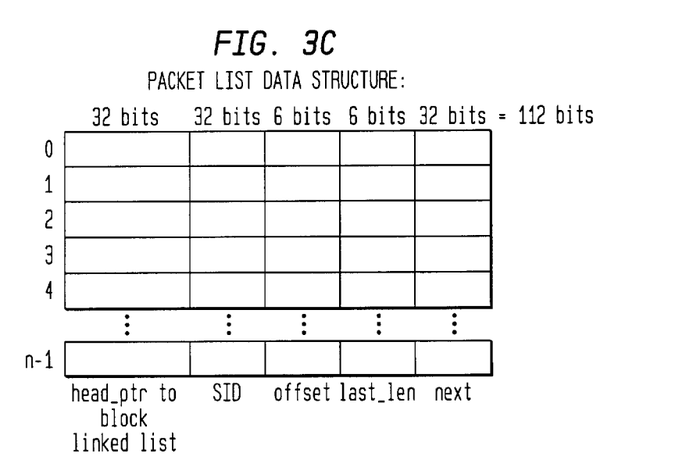

FIG. 3*c* shows the preferred data structure for link list memory 24. Link list memory 24 is used to keep track of PDUs and session flows through the queue engine. To do this, link list memory 24 must associate the blocks in packet memory 20 that form the PDUs, and in some cases PDUs from the same session or traffic flow, the data structure shown in FIG. 3c is used to accomplish this. The data structure has fields holding the head pointer, or address of the first block (head_ptr) in packet memory 20, as well as fields for session id SID, offset, the length of the last block of the PDU (last_len), and a next field for storing the pointer to the next associated block or PDU.

Figure 3D:
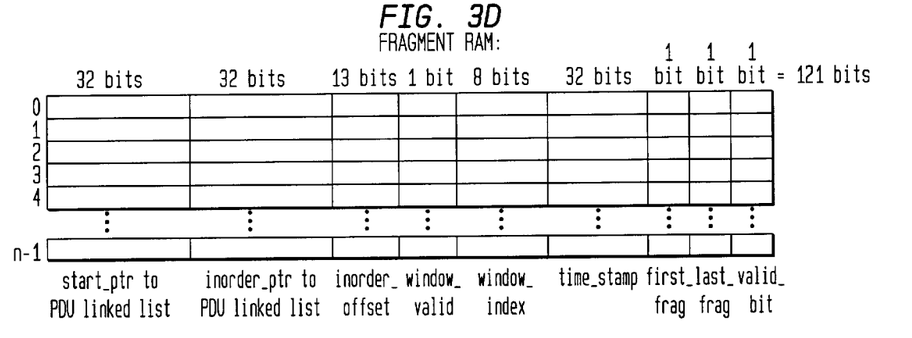
Figure 3E:
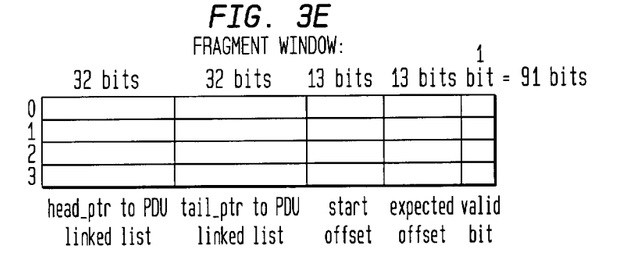

Referring now to FIGS. 3d and 3e, the data structures used by the fragment reassembly unit 28 and fragment memory 30 from FIG. 1 are shown. FIG. 3d shows the data structure for fragment memory 30. Each entry in the fragment memory contains fields, which are used in the reassembly process. The fields used in the preferred embodiment include a start pointer to link list memory 24 (start_ptr) which provides the link to the PDU attributes in link list memory 24. Also included are fields related to the fragment order, represented by an in order pointer (inorder_ptr) and an in order offset (inorder_offset). The next fields in the fragment memory data structure relate to the fragment windows used by fragment reassembly unit 28 to reassemble the fragments. Window valid (window_valid) and window index (window_index) fields relate the fragment memory information to the particular fragment window, if there is one assigned, being used to reassemble the fragmented PDUs. As described with reference to FIGS. 2 and 4b, a time stamp (time_stamp) is associated with each fragment to ensure that unreassembled fragments do not cause a resource problem if they are never reassembled. First fragment (first_frag), last fragment (last_frag), and valid bit (valid_bit) are flags set by fragment reassembly unit 28 in the reassembly process based on the characteristics of the PDU.

FIG. 3e shows the preferred embodiment of the fragment window used inside the fragment reassembly unit to aid in the reassembly of fragmented IP datagrams. The fragment window keeps track of partially reassembled fragments where the fragments received are noncontiguous and/or out of order. The fields consist of head pointer (head_ptr), and tail pointer (tail_ptr) which reference link list memory 24, start offset and expected offset, which give information related to the sequence of the fragments, and a valid bit flag.

Figure 3F:
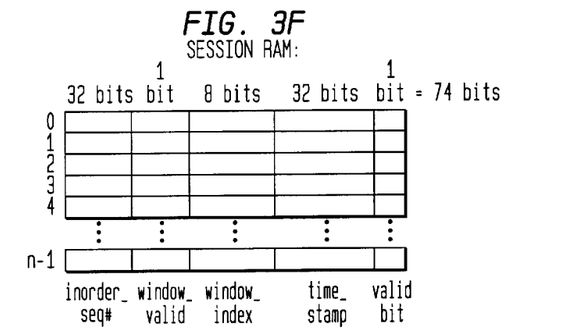
Figure 3G:
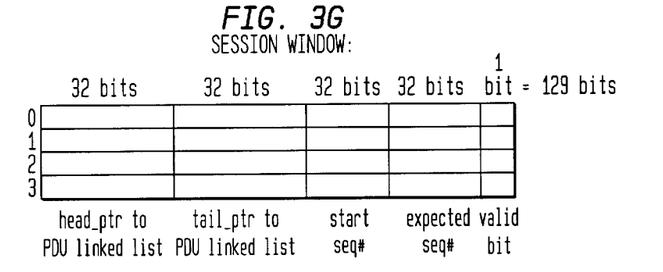

FIGS. 3f and 3g show the data structures used by the IP reordering unit 34 and IRU memory 44 from FIG. 1. The IP reordering unit works very similarly to the fragment reassembly unit as can be seen by the preferred embodiment of the session window data structure shown in FIG. 3f which includes essentially the same information using sequence numbers instead of offsets. The IRU memory data structure also resembles that of the fragment memory but is much simpler, including only fields for the in order sequence number (inorder_seq#), window valid, and window index referring to the windows used in IP reordering unit 34, and the time stamp and valid bit flag.

Figure 4A:
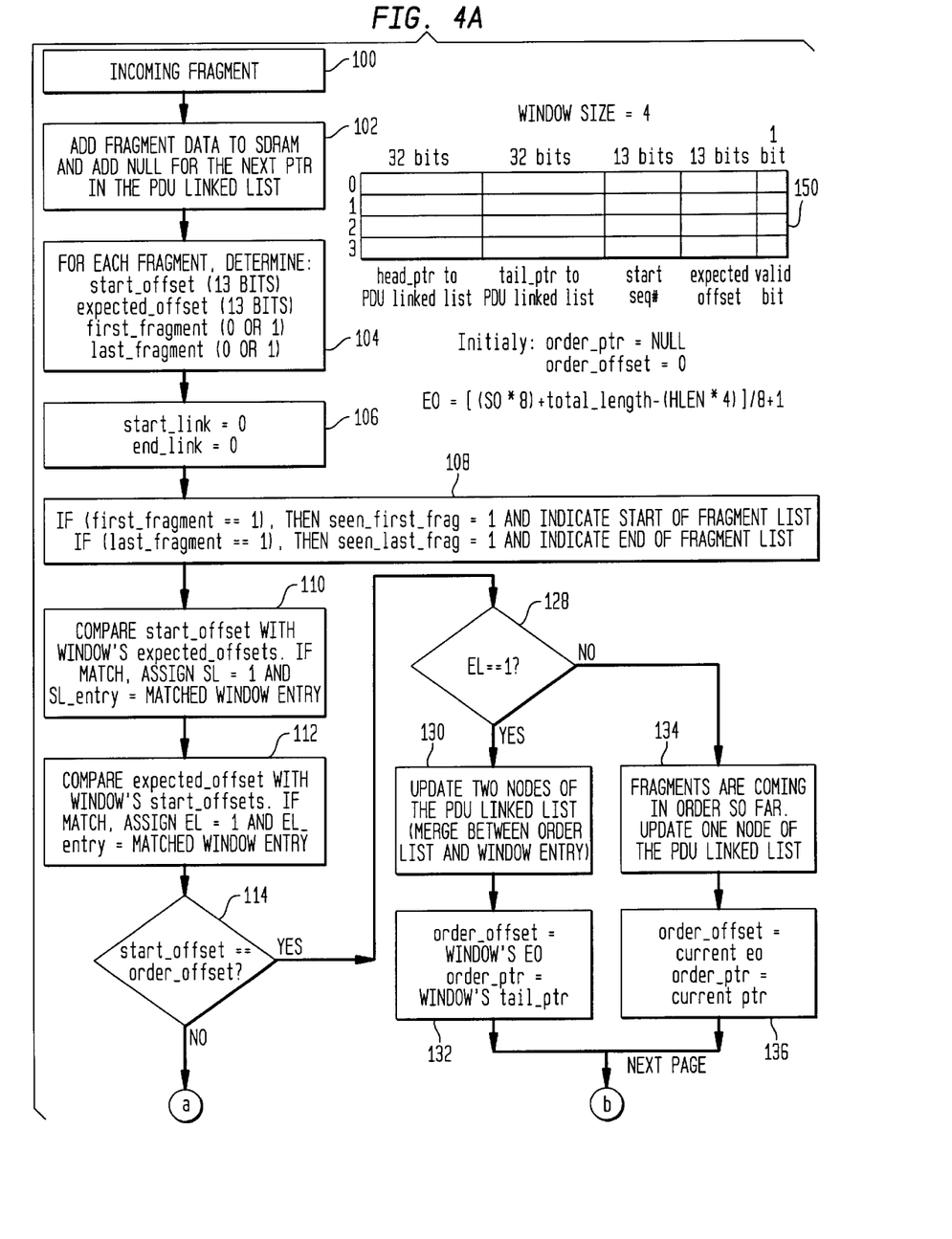
FIG. 4 is a diagram showing the fragment reassembly process of the present invention.
Figure 4B:
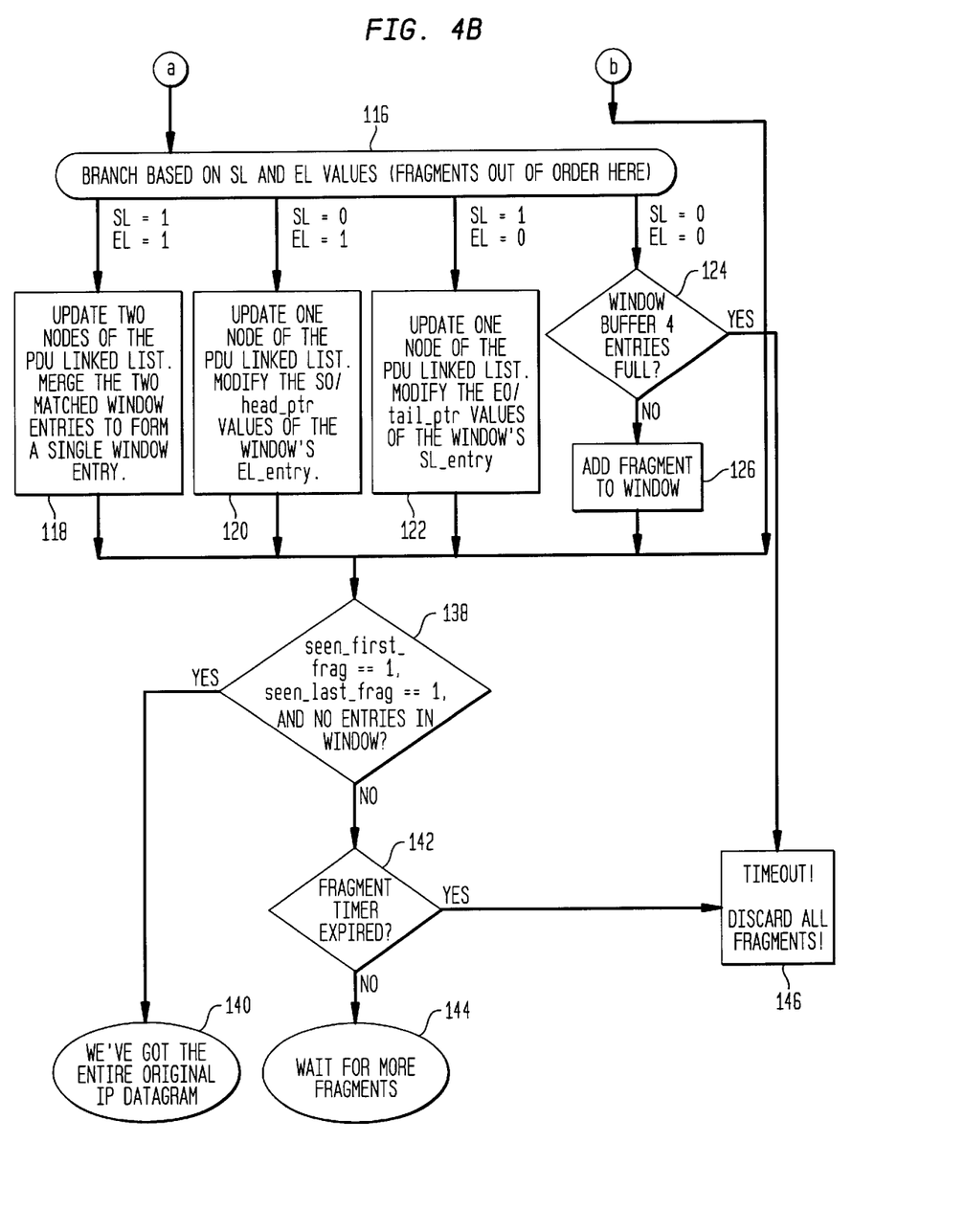

Referring now to FIGS. 4a and 4b, a flow chart of the fragment reassembly process is described. An incoming fragment 100 is received by the queue engine and in block 102 the incoming fragment's data is added to fragment memory 30 from FIG. 1 while the pointer to the next block is set to a null value in link list memory 24. After receiving a new fragment the queue engine is able to derive the four pieces of information necessary for performing the reassembly process from the fragment, either from specific fields within the header of the fragment, or by computation using fields within the fragment. Those four pieces of information are the start and expected offsets, and whether the fragment is the first or last fragment that makes up the complete PDU. This is shown by block 104 where each fragment is tested to determine its start offset, and its expected offset, which is the start offset of the next fragment in the series. Block 104 also determines if the fragment is the first or last fragment in the series of fragments.

From block 104 the process passes to block 106 where the start_link and end_link flags are set to zero. The process then passes to block 108, which examines the first and last fragment flags set in block 104. Block 108 looks at the first_fragment flag and the last_fragment flag and uses them to determine if the first or last fragment in the series have been seen, respectively. Next, block 110 examines the contents of window 150, which is the data structure shown in FIG. 3e, to determine if the start offset of the fragment matches the expected offset of any of the entries in window 150. If there is a match the start_link flag, or SL, is set to 1. Similarly, the next block in the process, block 112, compares the expected offset of the fragment to the start offsets of the entries in window 150 and sets end_link, or EL, to 1 if there is a match.

The process then proceeds to block 114, where the start offset of the fragment is compared to the order offset, the order offset being the expected offset of the next in-order fragment. For example, the order offset is zero if the first fragment has not yet been received, and is the expected offset of the first fragment if only the first fragment has been received. If the start offset of the fragment being processed is equal to the order offset then the process proceeds to block 128, which determines if the end_link flag is set. If the end_link flag is not set, meaning that either there are no entries in window 150 or that the expected offset of the fragment being processed does not match any of the start offsets of window entries, the process passes to block 134. Block 134 shows that all the fragments received thus far are in order and updates link list memory 24 from FIG. 1. The process then proceeds to block 136, which sets the order offset to the expected offset of the fragment being processed as well as updating the order pointer to the current pointer.

Returning now to block 128 we examine the case where the start offset is equal to the order offset shown in block 114 and the end_link is set to 1, signifying that the expected offset of the fragment in question is equal to the start offset of an entry in window 150. In this case, the fragment fills a gap between the completed in-order portion of the partially reassembled PDU and an entry in the window, such that the addition of the fragment will form a contiguous PDU from the first fragment to the end of the matched window entry. To place the fragment in the gap, the process in block 130, updates the two affected nodes of the link list memory, that is the node represented by the order offset and the node represented by the start offset of the window entry. With the link list updated, the process passes to block 132 where the order offset is now set to the expected offset of the matched window entry and the order pointer is set to the matched window entry's tail pointer. Additionally, block 132 removes the matched window entry since the matched window entry is now part of the in-order PDU. The process then continues to block 138 and proceeds as described below.

Returning to block 114 we examine the case where the start offset does not equal the order offset, meaning that a new entry must be made in window 150. In the case where the start offset does not equal the order offset the process passes to block 116 where a branch is made based on the values of the start_link and end_link flags. If the start_link and end_link are both set to 1 the fragment in question fills a gap between two entries in window 150. This is represented in block 118. In this case the link list memory must be updated to reflect a contiguous block forming a single window entry with a single start offset and a single expected offset. From block 118 the process passes to block 138 where the method continues as described below.

If, in block 116, the start_link is zero and the end_link is 1 then, as represented by block 120, the fragment is contiguous with the beginning of an entry in the window and the link list memory needs to be updated to reflect that the fragment and matched window entry now form a contiguous block with the start offset equal to the start offset of the fragment and the expected offset equal to the expected offset of the matched window entry. From block 120 the process again passes to block 138 and proceeds as described below.

Again, returning to block 116, if the start_link is 1 and the end_link is zero the process passes to block 122. This situation represents the case where the fragment is contiguous with the end of and entry in window 150. As before, the link list memory needs to be updated to reflect that the matched window entry and the fragment now form a contiguous block with the start offset equal to the start offset of the matched window entry and the expected offset equal to the expected offset of the fragment. From block 120 the process again passes to block 138 and proceeds as described below.

In the final case, where the start_link and the end_link are both zero, meaning that the fragment is a new window entry, the process passes to block 124. Block 124 checks to see if the window buffer is full. In the preferred embodiment the window buffer may include up to four independent window entries, although the maximum number of window entries could be any number greater than or equal to one. If the window buffer is full the process passes to block 146 where the fragments are discarded as if a time out condition had occurred. If the window buffer is not full the process passes to block 126 where the fragment becomes a new window entry. The process then passes to block 138.

From blocks 136, 132, 118, 120, 122, and 126 the process passes to block 138, which checks to see if all the fragments to make a complete PDU have been received. This is done by checking to see if both the first and last fragments have been received and if window 150 contains no entries. If all these conditions are met the process passes to block 140, which signifies that the entire PDU has been received. If any of these conditions are not met, the process passes to block 142, which checks the fragment timer for this series of fragments. If the fragment timer has expired the process passes to block 146 where all the fragments for this series are discarded, otherwise the process passes to block 144 and waits for additional fragments to be received, whereupon the process begins again with block 100.

As an illustration of the method described in FIGS. 4a and 4b, let us examine the reassembly of a PDU fragmented as follows:

| Fragment # | start offset | end offset |
|---|---|---|
| 0 | 0 | 64 |
| 1 | 64 | 144 |
| 2 | 144 | 272 |
| 3 | 272 | 384 |
| 4 | 384 | 484 |
| 5 | 484 | 487 |

Next, we will assume that the fragments arrive in the following order: 0, 1, 3, 2, 5, 4.

In the initial state, before the arrival of the first fragment, the link list memory contains no entries related to this PDU, no window has been assigned to track fragments, and the order offset is equal to zero. When fragment 0 arrives, the queue engine determines the start offset, and the expected offset, and whether this is the first fragment or the last fragment, as described above. The queue engine then sets the first_fragment flag to 1 and determines that the start offset of zero matches the order offset of zero. Since there is no window assigned to this fragment series, the start_link and end_link flags are zero. An entry is made in the link list memory and the order offset is updated to 64, the expected offset of fragment. Since this is the first fragment it is not necessary to assign a window to this series of fragments. Because the last fragment has not been received the process waits for the receipt of the next fragment associated with this PDU.

The next fragment to arrive is fragment 1 with a start offset of 64 and an expected offset of 144. It is neither the first or last fragment of the PDU. As with fragment 0, fragment 1's start offset is equal to the order offset, so the order offset is updated to 144 and an entry for fragment 1 is made in the link list memory. Again since we have received the fragments in order thus far, it is not necessary to assign a window to this fragment stream, and since the last fragment has still not been received, the process waits for the next associated fragment.

Next, fragment 3 arrives with a start offset of 272 and an expected offset of 384. Since the start offset does not match the order offset, and start_link and end_link are still zero because no window has yet been opened for this fragment series, the queue engine assigns a window to this fragment series and adds fragment 3 as the first window entry. The process then waits for the next associated fragment.

Fragment 2 arrives next with a start offset of 144 and an expected offset of 272. The process determines, as shown in block 112 of FIG. 4a, that the expected offset of fragment 2 is equal to the start offset of a window entry, here fragment 3, and therefore sets the end_link flag to 1. The process also determines that the start offset of fragment 2 is equal to the order offset. As described with respect to FIG. 4a, blocks 130 and 132, this means that the fragment being processed fills a gap between the in-order portion of the reassembled PDU and a window entry. Therefore, the process updates the pointers in the link list memory to place fragment 2 between fragments 1 and 3, changes the order offset to the expected offset of the matched window entry, here 384, and removes the window entry since we now have a contiguous, in-order, partially reassembled PDU. Because the last fragment has still not been seen the process waits for additional fragments.

The next fragment is fragment 5. It is the last fragment in the PDU, as shown by the more fragments bit in the header being set to zero, and has a start offset of 484 and an expected offset of 487. As with fragment 3, fragment 5's start offset does not equal the order offset and there are no window entries, so fragment 5 is placed into the window. Even though we have now seen the first and last fragments, there is still an entry in the window meaning that the reassembly process is not complete. The process, therefore, waits for the next fragment.

Finally, fragment 4 arrives. Similarly to fragment 2, fragment 4's expected offset matches the start offset of a window entry and its start offset matches the order offset. As before, fragment 4 is placed in the gap between the in-order portion of the PDU and fragment 5 by modifying the links in the link list memory, thereby forming a contiguous PDU. Since we have now seen the first fragment, the last fragment, and the window is empty as a result of fragment 5 being removed and added to the in-order PDU, we know we have a completely reassembled PDU. The reassembly process is, therefore, over and the reassembled PDU can be forwarded for processing.

As one skilled in the art would understand, the method for reassembling fragmented PDUs in FIGS. 4a, and 4b, and illustrated above, could be used equally effectively for reordering out of order PDUs in a data stream. In the reordering process the out of order PDUs are treated exactly like fragments for the purposes of reordering instead of reassembling. The reordering of out of order PDUs according to the method described in FIGS. 4a and 4b is also, therefore, within the scope of the present invention described herein.

The memory components described with reference to FIG. 1 can be any suitable electronic memory components such as DRAM, SDRAM or similar components. Both the memory components and the external CAM components are readily available from electronic suppliers. Although particular references may have been made to specific protocols, implementations and materials, those skilled in the art should understand that the queue engine can function independent of protocol, and in a variety of different implementations without departing from the scope of the invention.

Although the present invention has been described in detail, those skilled in the art should understand that they can make various changes, substitutions and alterations herein without departing from the spirit and scope of the invention in its broadest form.

We claim:

1. A queue engine for reordering out of sequence data packets which are associated with a traffic flow on a data network, some data packets including a sequence number that determines packet order, the queue engine comprising:

an input interface operable to accept the data packets into the queue engine for processing;

a packet memory connected to the input interface and storing the data packets being processed by the queue engine;

a packet assembler connected to the input interface and determining a session id, each session id corresponding to a particular traffic flow, the packet assembler also identifying fields in the header of the data packets;

a reordering unit connected to the packet assembler and reordering out of sequence data packets, the data packets being determined to be out of sequence using the sequence number; and a link list control unit connected to the packet assembler and the reordering unit and controlling a link list memory which stores a link list to keep track of data packets in the packet memory, the link list memory further operable to retrieve the data packets from the packet memory such that the data packets can be outputted from the queue engine.

2. The queue engine of claim 1 further comprising a fragment reassembly unit connected to the packet assembler and operable to reassemble fragmented data packets.

3. The queue engine of claim 1 wherein the session id is the contents of a location in a content addressable memory, the location being accessed by an address formed by combining a combination of fields from the data packet, the combination of fields uniquely identifying the particular traffic flow.

4. The queue engine of claim 1 wherein the data packets are stored in the packet memory in blocks of a predetermined size, such that the link list control unit keeps the locations of all the blocks necessary to form the complete data packet.

5. The queue engine of claim 1 wherein the reordering unit includes a time-out mechanism to discard unreordered data packets after a time-out condition has occurred.

6. The queue engine of claim 2 wherein the fragment reassembly unit includes a time-out mechanism to discard unreassembled fragments after a time-out condition has occurred.

7. A queue engine for reordering out of sequence data packets and reassembling fragmented data packets which are associated with a traffic flow on a data network, the queue engine comprising:

an input interface operable to accept the data packets into the queue engine for processing;

a packet memory connected to the input interface and storing the data packets being processed by the queue engine;

a packet assembler connected to the input interface and identifying fields in the header of the data packet, the packet assembler also operable to identify fragmented data packets and out of sequence data packets;

a reordering unit connected to the packet assembler and reordering out of sequence data packets; and a fragment reassembly unit connected to the packet assembler and operable to reform fragmented data packets into an unfragmented data packet.

8. The queue engine of claim 7 further comprising a link list control unit connected to the packet assembler, the reordering unit, and the fragment reassembly unit and controlling a link list memory which stores a link list to keep track of data packets in the packet memory, the link list memory further operable to retrieve the data packets from the packet memory such that the data packets can be outputted from the queue engine.

9. The queue engine of claim 7 wherein the packet assembler is further operable to determine a session id for each packet, the session id identifying the particular traffic flow with which the data packet is associated.

10. The queue engine of claim 9 wherein the session id is determined from a source address, a destination address, a source port, a destination port, and a protocol.

11. The queue engine of claim 7 wherein the fragment reassembly unit and the reordering unit include a time-out mechanism to discard unreassembled fragments and unreordered data packets, respectively, after a time-out condition has occurred.

12. The queue engine of claim 8 wherein the data packets are stored in the packet memory in blocks of a predetermined size, such that the link list control unit keeps the locations of all the blocks necessary to form the complete data packet.

* * * * *